Figure 2:
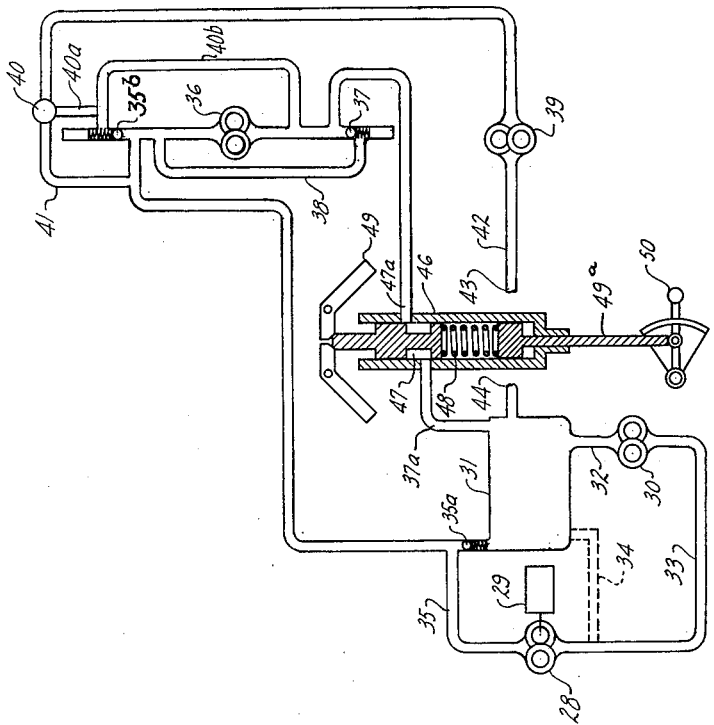

June 26, 1945.   W. S. HOOVER   2,379,301
HYDRAULIC TRANSMITTER RECEIVER PROPELLER CONTROL
Filed April 25, 1941

INVENTOR.
Walter S. Hoover
BY William B. Jaspert
Attorney.

Patented June 26, 1945

2,379,301

UNITED STATES PATENT OFFICE 2,379,301

HYDRAULIC TRANSMITTER RECEIVER PROPELLER CONTROL

Walter S. Hoover, Montreal, Quebec, Canada

Application April 25, 1941, Serial No. 390,283

3 Claims. (Cl. 170—163)

This invention relates to new and useful improvements in variable pitch propeller mechanism, and it is among the objects thereof to provide a hydraulic transmitter and receiver control for variable pitch propeller mechanism which is adapted to be operative for automatically adjusting the pitch setting of propeller blades by fluid pressure mechanism operative in response to variations in the engine speeds or which shall be responsive to manually operable control settings.

It is a further object of the invention to provide an hydraulic transmitter and receiver control for variable pitch propellers which is adapted to be actuated by the propeller motors or by an independent prime mover, the control system in itself constituting the actuating means for the pitch setting of the propeller blades.

Figure 1:
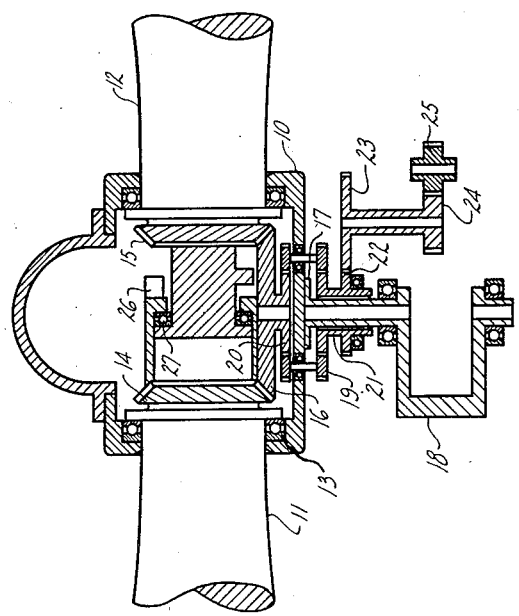

The invention will become more apparent from a consideration of the accompanying drawing constituting a part hereof in which like reference characters designate like parts and in which:

Fig. 1 is a horizontal cross-section partially in elevation through a propeller hub and a portion of the engine crank shaft diagrammatically illustrating the pitch setting mechanism; and Fig. 2 a view diagrammatically illustrating a hydraulic transmitter and receiver control for actuating the pitch setting mechanism.

With reference to Fig. 1 of the drawing, the numeral 10 generally designates a propeller hub structure, having propeller blade roots 11 and 12 journalled for rotation therein. The blade roots are provided with anti-friction bearings 13, which for illustration are shown as single ball races but which in practice may be stack bearings.

The ends of the propeller blade roots are provided with beveled gears 14 and 15, that are actuated by a connecting master gear 16. The hub 10 is rotatable by its connection with the flanged end 17 of the engine crank shaft 18 and the master gear 16 is rotatable by planetary gear wheels 19, interacting with the teeth of a spur gear 20 integrally formed with the bevel gear 16 and the teeth of a sleeve gear 21, having a spur gear 22, interacting with the teeth of a sleeve gear 23. The sleeve gear 23 is integrally formed with a spur gear 24, interacting with the teeth of a gear wheel 25, which is the driving member operable through the hydraulic system of Fig. 2 in the manner hereinafter explained.

Counterweight 26 balances out the centrifugal torsion moment of the propeller blades at a desired speed of the latter to relieve the load on the pitch actuating gear wheels, only sufficient power being required to overcome the friction drag on the bearing 27.

The hydraulic transmitter and receiver control will now be described in connection with Fig. 2 of the drawing.

The transmitter 28 is a small pump which may be driven by the propeller engine (not shown) or independently driven by a selective speed electric motor 29. If the lubricating fluid of the engine is employed, it may be supplied to the transmitter pump 28 by a pump 30 driven by the engine. Where an independent source of fluid such as oil or glycerin for low temperature use is employed, it may be drawn direct from a sump tank 31 through line 32 by the pump 30 and delivered under pressure through conduits 33 and 35 past relief valves 35a and 35b to the receiver or fluid motor 36, in which case the transmitter pump 38 is eliminated as is the connection 34 and valve 34a. As shown in Fig. 2, the pump 30 may be eliminated and the transmitter pump 28 may be operated independently of the engine by an electric motor 29 to draw the fluid from the sump 31 through conduit 34 which is transmitted under pressure through conduit 35 to the receiver 36. The system may also be operated by using both the transmitter pump 28 with the electric motor 29 and the engine driven pump 30 by employing the valve 34a to cut off either line 33 or 34, as the case may be. The relief valves 35a and 35b are provided to permit circulation of the fluid from conduit 35 back to the sump 31 when the pressure in the line overcomes valves 35a and 35b.

The hatching of conduit 35 designates fluid under pressure, a check valve 37 being provided to by-pass fluid around the receiver motor 36 through conduit 38 under certain operating conditions, as hereinafter stated.

Numeral 39 designates a feathering pump for use when the propeller is not rotating which is driven by an electric motor. The fluid flow from pump 39 is manually controlled through a valve 40 which connects the high pressure fluid of the pump to the receiver motor 36 through either conduit 40a to unfeather or 41 to feather the blades, as the case may be.

The receiving inlet of the feathering pump connects through conduit 42 with sump tank 31, the conduit being shown broken at 43 and 44.

The fluid flow from the high pressure side of the transmitter 28 through conduit 35 to the fluid motor or receiver 36 is controlled by a governor valve generally designated by the numeral 46. The governor valve 46 may be embodied in the propeller unit or it may be connected direct to the engine. In either case, it is connected by a spline or gearing to the crank shaft 18 of the engine shown in Fig. 1. The governor valve, having a circular port 47, is normally biased by a speeder spring 48 and is movable axially by governor fly balls or weights 49. The speeder spring 48 may be preloaded by a piston rod 49a, manually operable by a quadrant control through the lever 50.

Operation

The operation of the above-described hydraulic transmitter and receiver mechanism will now be described.

If the fluid pressure is developed by the engine, through pump 30, the receiver will operate at the same speed as the engine, and if the transmitter 28 is independently driven by the electric motor 29 such a motor will be a selective speed motor which may be operated in synchronism with the engine speed.

The receiver 36 likewise synchronized with the transmitter 28, if the governor is in its normal setting, if running at engine speed will produce no rotation of the drive gear 25, so that the peripheral speed of the planetary gears 19 will be the same speed as the propeller hub speed. There will then be no movement of the master gear 16 and blades 11 and 12 will be at their normal pitch setting. The receiver 36 is held at any selected speed by the governor valve 46, which is controlled by the speeder spring 48 to maintain circulation of the pressure fluid from the engine pumps 30 or 28 or both through conduit 35 and through the receiver 36. When the engine speed varies from normal, more or less fluid will pass through the receiver 36, depending on the position of the pressure balanced governor valve 47. Consequently, if the propeller speed drops below the receiver speed, the speed differential between the propeller and receiver gear 25 will effect rotation of gear 16 to decrease the pitch setting, and if the propeller speed exceeds the metered speed, the speed differential will rotate gear wheel 16 in the opposite direction to advance the pitch setting of the blades.

The receiver 36 will operate at the same speed as the pump 28, provided the same volume of fluid passes through both. The governor valve functions to meter more or less fluid from the receiver 36 by causing it to by-pass the relief valve 37 through the governor valve drain duct 37a. When the governor valve cuts off port 47a either by manual operation of lever 50 or by the governor fly-weights 49, the back pressure in conduit 37a will open the relief valve 37 and permit recirculation of the fluid through the conduit 38, and under these conditions the pressure in conduit 35 will open relief valve 35a and cause the fluid delivered by the transmitter pump 28 to circulate through the sump 31. The size of the orifice 47a is determined by movement of the governor valve responsive to the engine speed, and when the engine speed increases the orifice 47a is decreased and the receiver 36 slows down, increasing the pitch until the engine speed returns to the desired speed. When the governor valve orifice 47a is completely closed, the fluid under pressure from pump 30 or from pump 28 will by-pass to the pump tank 31 through the relief valve 35a. When the engine speed decreases, the orifice area 47a is increased, thereby increasing the speed of the receiver 36, which, through the gear of Fig. 1, rotates the blade roots to effect a corresponding pitch setting. That is to say, for example, if the engine speed increases 50 R. P. M., the hub gear 24 has a relative rotational speed of 50 R. P. M. in the increased angle direction, and if the engine speed decreases 50 R. P. M., the hub gearing has a relatively rotational speed of 50 R. P. M. in the opposite direction.

Whenever the propeller is running at synchronous speed, there is no relative movement of the hub gearing because pitch line velocities of the hub gear 24 and the mating receiver gear 25 are equal.

The feathering and unfeathering of the propeller, when the engine is not rotating, is accomplished by means of the auxiliary pump 39. Pump 39 draws the fluid direct from sump 31 through conduit 42 and delivers the same to the valve 40, from which it may be routed either through the conduit 40a to the shunt 40b to operate the receiver in one direction of rotation for feathering or unfeathering, as the case may be, or the high pressure fluid may be routed from pump 39, passed valve 40 through the conduit 41 to the other side of the receiver to operate the same in the other direction of rotation.

By means of the quadrant control lever 50, the control rod 49a gives complete control of the spring loading, which controls the position of the governor valve in opposition to the centrifugal force developed by the flyweights 49. This gives complete manual control of the valve position and the flow of the fluid. Where the electric motor 29 is employed to drive the transmitter 28, it may be set to operate at the speed of the propeller engine. Should the engine cut out and the propeller be feathered, the motor 39 operates to draw the oil from the sump through the conduit 42 to valve 40, then through either duct 40a or 41 to the receiver 36 to feather or unfeather the blade, as the case may be. If the pressure fluid from pump 39 is routed to receiver 36 through duct 40a, it is returned to sump 31 through the relief valve 35a, and if the fluid from pump 39 is routed to receiver 36 through duct 41, it will be returned to the sump 31 by duct 37a through the governor valve 46.

Likewise, when the selective motor 29 is employed, the pump 39 and the valve 40 with the connecting conduits 41 and 40a are not required.

It will be apparent that the transmitter may be operated either by an engine pump or by an independent selective speed motor, or if the engine pump alone is used a separate and independent feathering pump 39 may be employed. The transmitter motor 29 is therefore an alternate plan of operation and is not needed when the engine pump 30 and the feathering pump 39 are employed.

It is evident from the foregoing description of the invention that a hydraulic transmitter and receiver control may be utilized as the actuating mechanism for a variable pitch propeller through suitable gearing and that such a device is automatically responsive to variations in the engine speed, or may be controlled manually through the governor valve. Such an actuating system may also be controlled by a manually operable valve to feather the propeller blades or by a selective speed motor as desired.

Although one embodiment of the invention has been herein illustrated and described, it will be evident to those skilled in the art that various modifications may be made in the details of construction without departing from the principles herein set forth.

I claim:

1. In a variable pitch propeller mechanism, a propeller engine, a hub structure mounted on the engine shaft and having blades mounted for rotary movement therein, a differential gear mechanism connected to said blades, a fluid pressure receiver for driving said mechanism, a rotary fluid transmitter for delivering high pressure fluid to said receiver, said transmitter operating in synchronism with the propeller engine to maintain normal pitch setting of the blades for normal speed of the engine, means responsive to the propeller speed for varying the fluid flow through the receiver to effect a speed differential between the drive and driven elements of said gear mechanism to thereby change the pitch setting of the propeller blades, and means operable independently of the propeller for selectively directing fluid pressure to operate the receiver in either direction of rotation.

2. In a variable pitch propeller mechanism, a propeller engine, a hub structure mounted on the engine shaft, having blades mounted for rotary movement therein, gear wheels connected to the inner ends of the blades, a master gear for actuating said blade gear wheels, a differential gear mechanism including said master gear as the driven element, a drive gear and planetary gears interacting with the teeth of the master gear and drive gear, a hydraulic receiver motor for actuating said drive gear, a rotary fluid transmitter operable by the propeller engine for driving said receiver motor, a second rotary fluid transmitter and a prime mover therefor a circulating system for said receiver motor and said transmitters, a fluid source therefor, governor valve means interposed between the first named transmitter and the receiver to direct the fluid to control the direction of rotation of the receiver, and pressure responsive means permitting circulation of the pressure fluid on both sides of said valve when the latter is in closed position.

3. In a variable pitch propeller mechanism a hub structure having blades mounted for rotary movement therein, gear wheels for simultaneously actuating said blades in their pitch adjusting movements, a master gear for said blade gears, planetary gear wheels for maintaining a fixed position of the master gear for normal speed of the propeller, a hydraulic receiver operable by fluid pressure connected to actuate the planetary gears to effect adjustment of the pitch setting and a rotary fluid transmitter for delivering fluid at a velocity to maintain synchronism of the receiver and propeller speeds during normal operation of the propellers, a source of fluid and a circulating system connecting said receiver and transmitter with the fluid source, means for varying the relative volume of flow between the transmitter and receiver for changing the speed of the receiver in accordance with the change in speed of the propeller hub, and means operable independently of the propeller drive mechanism for delivering fluid under pressure to said receiver to feather and unfeather the propeller blades.

WALTER S. HOOVER.